Patented July 9, 1946

2,403,707

UNITED STATES PATENT OFFICE 2,403,707

PRODUCTION OF ALGINIC ACID COMPOUNDS

George Eric Cunningham, Norman Henry Chamberlain, and John Bamber Speakman, Leeds, England, assignors to Cefoil Limited, Maidenhead, England, a British company No Drawing. Application October 5, 1943, Serial No. 505,033. In Great Britain July 1, 1942

6 Claims. (Cl. 260—209.6)

This invention comprises improvements in or relating to the production of alginic acid compounds.

Hitherto, it has been found extremely difficult to prepare organic derivatives of alginic acid when simple aqueous media are inadmissible (see, for example, Hirst, Jones and Jones, J. Chem. Soc. 1939, page 1880). The difficulty seems to arise from the fact that the hydroxyl groups of alginic acid are so placed in the long-chain molecules that they are in close proximity, with the result that hydrogen bond formation takes place, and the compact structure so obtained is inaccessible to or non-reactive with even comparatively small molecules of organic reagents.

According to the present invention, in the production of organic derivatives of alginic acid, the alginic acid is first swollen in an aqueous medium, the water is then removed from the swollen structure, while still maintaining the swollen state, by introducing an organic liquid and the reactions necessary for the production of the desired organic derivative are thereafter carried out. Apparently the swelling of the structure in water leads to separation of the hydroxyl groups of the chains of polymerised mannuronic acid of which the material consists and when the water is removed from the swollen structure by the organic liquid sufficient separation of the hydroxyl groups still persists for the subsequent reactions to take place, if necessary in media containing no water.

Attempts made to acetylate alginic acid according to well-known methods, e. g. those of Miles, British Patent No. 19,330 of 1905; Dreyfus, French Patent No. 478,023 of 1914; and Ost. Zeit. angew. Chem., 1919, 32, 68 were completely unsuccessful with air-dry filaments although such methods are known to be successful with cellulose. If, however, alginic acid yarn is soaked in water for a time to induce swelling, and the water then displaced by glacial acetic acid, rapid acetylation can be brought about by acetic anhydride in presence of a suitable catalyst, e. g. sulphuric acid. The process can be applied to alginic acid in powder, film or fibrous form.

The alginic acid yarn, soaked in water at room temperature for say two hours, may be treated with successive changes of glacial acetic acid until the quantity of water retained by the yarn is less than 30% on the initial air-dry weight of the yarn. The best results are obtained when the whole of the water is removed.

The following are examples of typical procedures in accordance with the invention:

Example I

A 20-yard hank (0.5–1.0 gram) of purified alginic acid yarn is soaked in water for 10 minutes or more, lightly blotted and treated with successive lots of glacial acetic acid in four successive decantations of 30 cubic centimetres each over a period of not less than one hour.

After draining off most of the acetic acid, the specimen is introduced into 20–30 cubic centimetres of an acetylating mixture containing a non-solvent, as follows:

| | Grams |
|---|---|
| Acetic anhydride | 60 |
| Benzene | 180 |
| Sulphuric acid (conc.) | 1.5 |

(a) The reaction may be allowed to proceed for 17–24 hours at 25° C., and after purification with benzene and ether, the resulting yarn is white and lustrous, contains 33.0% combined acetyl, and is substantially soluble in aqueous acetone. Yield 95–98% of theory.

(b) A similar product is obtained if the reaction is allowed to proceed for one hour at 25° C., followed by a shorter period at a higher temperature (e. g. 15–30 minutes at 50–60° C.).

Example II

One gram of alginic acid powder is soaked in water for 10 minutes or more and is then dehydrated as described in Example I with successive changes of glacial acetic acid.

After treatment with 30 cubic centimetres of the acetylating reagent, set out in Example I, for 24 hours at 25° C., a white product, soluble in aqueous acetone, is obtained.

Example III

A 20-yard hank (0.5–1.0 gram) of purified alginic acid yarn is soaked in water for 10 minutes or more, and is subsequently dehydrated, after light blotting, with two successive lots of 30 cubic centimetres of absolute methyl alcohol over a total period of one hour.

Twenty cubic centimetres of acetylating reagent containing benzene, acetic anhydride, and sulphuric acid in the proportions set out in Example I are added. The initial exothermic reaction, which raises the temperature to 60° C., is controlled by strong cooling, and when the temperature has fallen to about 30° C. a further 10 cubic centimetres of reagent is added, and the reaction allowed to proceed for 24 hours at 25–30° C. The product is substantially diacetyl alginic acid (34.1% combined acetyl) and is soluble in aqueous acetone.

*Example IV*

6.5 grams air-dry alginic acid yarn is soaked for 10 minutes or more in a normal solution of sulphuric acid, and dehydrated with four successive changes of 130 cubic centimetres glacial acetic acid over a period of not less than one hour.

Thus the catalyst is introduced during the presoak in water. Most of the catalyst is removed in subsequent treatment to remove water, prior to acetylation but sufficient remains to facilitate the reaction. This method is valuable in preventing degradation.

Acetylation is carried out after draining off most of the acetic acid, 150 cubic centimetres of the following mixture being used for the purpose:

|  | Grams |
|---|---|
| Benzene | 180 |
| Acetic anhydride | 60 |

The reaction is allowed to proceed for 24 hours at 25° C., or alternatively, for 1 hour at 25° C. followed by 15–30 minutes at 50–60° C. The product is substantially the diacetyl derivative.

*Example V*

6.5 grams air-dry alginic acid yarn is soaked for 10 minutes or more in a normal solution of perchloric acid, and dehydrated with four successive changes of 130 cubic centimetres glacial acetic acid over a period of not less than one hour.

Acetylation may be carried out after draining off most of the acetic acid, 150 cubic centimetres of the following mixture being used for the purpose:

|  | Grams |
|---|---|
| Benzene | 180 |
| Acetic anhydride | 60 |

The reaction is allowed to proceed for from 2–24 hours at 25° C., or alternatively, for one hour at 25° C., followed by 15–30 minutes at 50°–60° C. The product is substantially the diacetyl derivative.

This example is like Example IV, except that perchloric acid is used as the catalyst. Perchloric acid could be used in all the above examples in place of sulphuric acid.

*Example VI*

1.5 grams of air-dry alginic acid yarn is soaked in water for 10 minutes or more, dehydrated with four successive changes of 50 cubic centimetres glacial acetic acid, and after draining is treated with 50 cubic centimetres of reagent containing acetic anhydride and benzene, (but no catalyst) in the following proportions:

|  | Grams |
|---|---|
| Benzene | 180 |
| Acetic anhydride | 60 |

The reaction is allowed to proceed for one week at 20–25° C. and the product purified with benzene and ether. The degree of acetylation of the product is not high (about 5% combined acetyl) but it is superior in handle and appearance to alginic acid yarn.

*Example VII*

1.5 grams air-dry alginic acid yarn is soaked in water for 10 minutes or more, dehydrated with four successive changes of 50 cubic centimetres glacial acetic acid, and, after draining, is treated with 50 cubic centimetres of reagent of the following composition:

|  | Grams |
|---|---|
| Benzene | 180 |
| Acetic anhydride | 60 |

The reaction is allowed to proceed for 48 hours at 40° C., when a product containing 10–12% combined acetyl is obtained, which swells highly in water and which is dispersed by mixtures of water and acetone.

*Example VIII*

1.5 grams air-dry alginic acid yarn is soaked in water for 10 minutes or more, dehydrated with four successive changes of 50 cubic centimetres glacial acetic acid and after draining, is treated with 50 cubic centimetres of reagent of the following composition:

|  | Grams |
|---|---|
| Benzene | 180 |
| Acetic anhydride | 60 |

The reaction is allowed to proceed for 24 hours at 60° C., when a product containing about 16% combined acetyl is obtained.

*Example IX*

A 40-yard hank of purified alginic acid yarn (1.65 grams air-dry) is soaked for 10 minutes or more in a normal solution of perchloric acid, drained free from excess moisture, and then dehydrated with four successive changes of 50 cubic centimetres of glacial acetic acid over a period of one hour or more. Excess acetic acid is drained off, and the material treated with the following mixture at 60° C. for 30 minutes:

|  | Grams |
|---|---|
| Propionic anhydride | 12 |
| Benzene | 36 |

The product is purified with benzene and ether to remove traces of the reagent. It is a white lustrous yarn which may be heated to at least 60° C. without discolouration, is soluble in aqueous acetone and in benzene-alcohol mixtures, and is substantially composed of dipropionyl alginic acid (40% propionyl). The yield is 92% of that theoretically obtainable.

The above Examples VI, VII and VIII are of processes where no catalyst is employed.

In Example III it will be noted that methyl alcohol is used to displace water instead of glacial acetic acid. Other organic liquids may be used for the purpose providing they are sufficiently polar to prevent re-association of the hydroxyl groups of the alginic acid when the water is removed.

Moreover instead of displacing water from the swollen alginic acid by means of glacial acetic acid or methyl alcohol, it could be removed by combination; thus, acetic anhydride could be added, with cooling, to water-swollen or sulphuric-acid-solution-swollen alginic acid. The water would thus be removed by combination with acetic anhydride to form glacial acetic acid.

Finally the principles described above may be applied in the preparation of other esters (the butyrate, for example) and mixed esters (the aceto-butyrate, for example).

We claim:

1. In the production of lower fatty acid esters of alginic acid, the steps of first swelling the alginic acid in an aqueous medium for at least ten minutes, then removing water from the swollen structure, while still maintaining the swollen state, by introducing an hydrophyllic organic liquid which is sufficiently polar to prevent re-association of the hydroxyl groups of the alginic acid when the water is removed, and thereafter carrying out the reactions necessary for the production of the desired lower fatty acid esters.

2. A process as claimed in claim 1 wherein the water is removed by displacement with glacial acetic acid.

3. A process comprising the steps set forth in claim 1 wherein removal of the water is effected by causing it to combine with an hydrophyllic organic liquid which is introduced into the reaction mixture, said hydrophyllic organic liquid being sufficiently polar to prevent reassociation of the hydroxyl groups of the alginic acid when the water is removed.

4. A process as claimed in claim 1 wherein the reaction of the alginic acid, after swelling, is facilitated by the presence of a catalyst in the reaction mixture.

5. A process as claimed in claim 1, wherein a catalyst is introduced as an ingredient of the aqueous swelling medium.

6. In the production of lower fatty acid esters of alginic acid, the steps of first swelling the alginic acid in an aqueous medium, then removing water from the swollen structure while still maintaining the swollen state, by introducing a hydrophyllic organic liquid of the class consisting of lower fatty acids and their anhydrides which is sufficiently polar to prevent re-association of the hydroxyl groups of the alginic acid when the water is removed, and thereafter carrying out the reactions necessary for the production of the desired lower fatty acid esters.

GEORGE ERIC CUNNINGHAM.
NORMAN HENRY CHAMBERLAIN.
JOHN BAMBER SPEAKMAN.